United States Patent [19]

Kishi et al.

[11] Patent Number: 4,884,211
[45] Date of Patent: Nov. 28, 1989

[54] NUMERICAL CONTROL UNIT FILE PROTECTION SYSTEM

[75] Inventors: Hajimu Kishi, Hino; Kunio Tanaka, Akishima; Masashi Yukutomo, Sagamihara; Teruyuki Matsumura, Hachioji, all of Japan

[73] Assignee: Fanuc Ltd., Minamitsuru, Japan

[21] Appl. No.: 196,783

[22] Filed: May 18, 1988

Related U.S. Application Data

[63] Continuation of Ser. No. 32,962, Mar. 31, 1987, abandoned, which is a continuation of Ser. No. 642,663, Aug. 17, 1984, abandoned.

[30] Foreign Application Priority Data

Dec. 29, 1982 [JP] Japan ................ 57-228510

[51] Int. Cl.$^4$ .............................................. G05B 9/00
[52] U.S. Cl. ................ 364/474.22; 364/200; 364/286.5
[58] Field of Search ................ 364/200, 900, 474.22

[56] References Cited

U.S. PATENT DOCUMENTS

| | | | |
|---|---|---|---|
| 3,576,544 | 4/1971 | Cordero, Jr. et al. | 364/200 |
| 3,599,159 | 8/1971 | Creeth et al. | 364/200 |
| 3,742,458 | 9/1971 | Inoue et al. | 364/200 |
| 3,744,034 | 7/1973 | Paul | 364/200 |
| 3,890,601 | 6/1975 | Pietrolewicz | 364/200 |
| 3,893,084 | 7/1975 | Kotok et al. | 364/200 |
| 4,104,718 | 8/1978 | Poublan et al. | 364/200 |
| 4,118,789 | 10/1978 | Casto et al. | 364/900 |
| 4,135,240 | 1/1979 | Ritchie | 364/200 |
| 4,332,009 | 5/1982 | Gerson | 364/200 |
| 4,434,471 | 2/1984 | Hildinger | 364/900 |
| 4,458,315 | 7/1984 | Uchenick | 364/200 |
| 4,471,163 | 9/1984 | Donald et al. | 364/200 |

FOREIGN PATENT DOCUMENTS 49113 of 0000 European Pat. Off. .

OTHER PUBLICATIONS

TRS-80 Mode, II, Operation Manual, Radio Shack, 1979, Fort Worth, Tex., U.S.; pp. 1/12–1/15 & 2/47.
"Computer Structures: Principles and Examples," Siewiorek, Bell, Newell, McGraw Hill, ©1982, pp. 533–550.

Primary Examiner—Allen MacDonald
Attorney, Agent, or Firm—Staas & Halsey

[57] ABSTRACT

There is provided a numerical control unit having a processor (102a), a control program memory (102b), a memory (102c) for storing files, and input means (102d) for accessing the files. The processor (102a), in accordance with the control program, processes externally entered control data to numerically control a machine connected thereto. The arrangement is such that the name of a file to be protected is stored in the memory (102c) of the numerical control unit and, the name of an object file is compared with the protected file name in the memory (102c), when a modification command and the name of the object file are entered from the input means (102d). Processing for modifying the file is executed, on the condition that there is a processing confirmation input from the input means (102d), when the object is a file protected file.

4 Claims, 3 Drawing Sheets

NUMERICAL CONTROL UNIT FILE PROTECTION SYSTEM

BACKGROUND OF THE INVENTION

1. Technical Field

This invention relates to a computerized numerical control unit for numerically controlling a machine tool or the like, and more particularly to a numerical control unit file protection system capable of protecting a file stored in a memory against an erroneous updating operation.

2. Description of the Related Art

Numerical control units (hereafter referred to as "NC units") are used in applying NC techniques to a variety of machines, and the filed of application thereof is ever widening. These NC units are now typically computers and are capable of implementing various functions by means of software. Recent NC units have a parameter control function in addition to the basic control software and are adapted to be able to store several files, with file names affixed thereto, in a submemory. By way of example, diagnosis and production management are facilitated if such information as the change in status of a machine with time, as well as the operating time, is filed. Files of this kind are capable of being modified by deletions, substitutions and changes in file name, even though the files contain information which is desired to be left unchanged.

The operation of NC units has become ever more simplified by adopting operator guidance displays and the like, and even an individual who does not possess a full understanding of NC units is capable of readily altering a file. Consequently, there are instances where important files that are not to be altered are deleted by an erroneous operation, such as by entering a file name incorrectly. A solution to this problem is desired.

SUMMARY OF THE INVENTION

An object of the present invention is to provide a numerical control unit file protection system capable of protecting important files from an erroneous modification operation.

According to the present invention, there is provided a numerical control unit having a processor, a memory for storing a control program and files, and input means for accessing the files. The processor, in accordance with the control program, processes externally entered control data to numerically control a machine connected thereto. The arrangement is such that the name of a file to be protected is stored in the memory and the name of an object file is compared with the protected file name in the memory when a modification command is entered, along with the name of the object file, from the input means. Processing for modifying the file is executed, on the condition that there is a processing confirmation input from the input means, when the object file coincides with the protected file. According to the present invention, a file which is to be protected is prevented from being manipulated incorrectly by an operator during modification processing.

DESCRIPTION OF THE PREFERRED EMBODIMENTS

Figure 1:
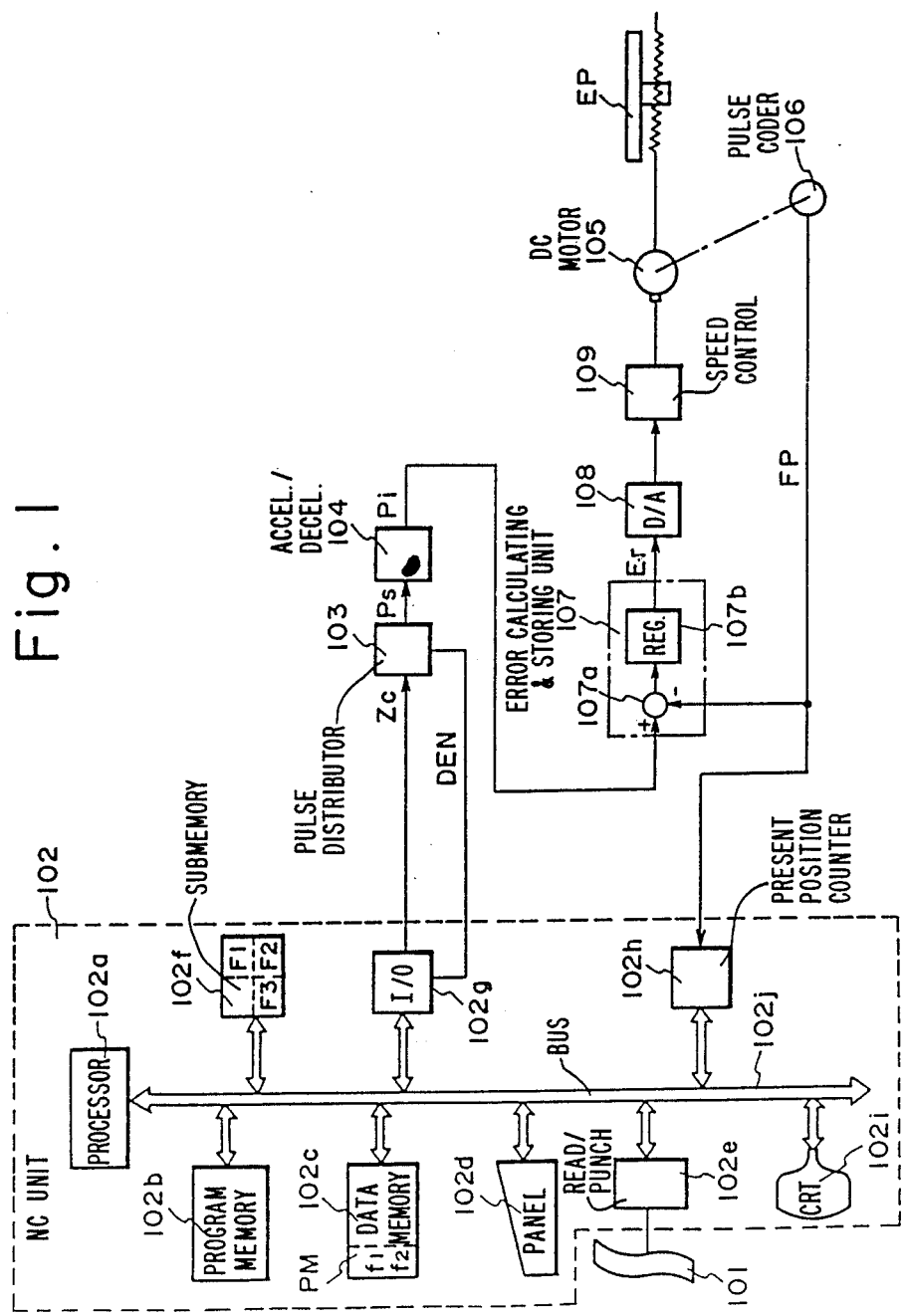
FIG. 1 is a block diagram illustrating an embodiment of the present invention.

FIG. 1 is a block diagram illustrating an embodiment of the present invention in which a numerical control unit is applied to a die-milling electric discharge machine.

In FIG. 1, numeral 101 denotes a paper tape containing punched numerical control (NC) command data. Specifically, the paper tape 101 stores NC command data such as positioning information for machining and M-, S- and T-function information. Numeral 102 denotes a numerical control (NC) apparatus which causes a tape reader, described below, to read in the NC data from the paper tape 101. The NC unit 102 decodes the read NC data and delivers, e.g., M, S and T function instructions to the machine through a magnetics panel, not shown, when the data is indicative of such function instructions, and a delivers a move command $Z_c$ to a pulse distributor 103 when the data is indicative of a move command. The NC apparatus 102 is composed of a processor 102a for executing processing in accordance with a control program, a program 102b for storing a prescribed control program, a data memory 102c for storing data, an operator's panel 102d for operator control, a tape reader/puncher 102e, a submemory 102f for storing files, an input/output port 102g, a present position counter 102h, a display unit 102i, such as a CRT, and an address/data bus 102j interconnecting the foregoing items.

The program memory 102b is a read-only memory (ROM) or by a non-volatile memory and stores a numerical control program for numerically controlling a machine. By way of example, for an electric discharge machine, the program memory 102b would store a machining control program for controlling machining electrode feed, table feed and machining voltage, etc. The data memory 102c is composed of a non-volatile memory which, in addition to storing NC data (such as machining position data) from the paper tape 101, stores a programmed machining program in a parameter area PM in the form of parameters or a user macro.

Numeral 103 denotes a pulse distribution which executes well-known pulse distribution computations on the basis of the move command $Z_c$, and generates distributed pulses $P_s$ at a frequency corresponding to a commanded speed. Numeral 104 designates a known accelerator/decelerator circuit which generates a train of pulses $P_i$ by rectilinearly accelerating the pulse rate of the train of distributed pulses $P_s$ at the occurrence of this pulse train, and by rectilinearly decelerating the same at the end thereof. Numeral 105 indicates a D.C. motor by which an electrode EP is fed for machining. Numeral 106 denotes a pulse coder which generates one feedback pulse FP each time the DC motor rotates by a predetermined amount. Numeral 107 denotes an error calculating and storing unit which is constructed of, for example, a reversible counter, and which stores a difference $E_r$ between the number of the input pulses $P_i$ generated by the accelerator/decelerator circuit 104 and that of the feedback pulses FP. This error calculating and storing unit may be constructed, as shown in FIG. 1, of an arithmetic circuit 107a for calculating the difference $E_r$ between $P_i$ and FP, and an error register 107b for storing $E_r$. More specifically, assuming that the DC motor 105 is rotating in the forward direction in accordance with a command causing the DC motor 105 to rotate in this direction, the error calculating and storing unit 107 operates in such a manner that each time the input pulse $P_i$ is generated, the pulse increments the difference $E_r$, while each time the feedback pulse FP is generated, the difference $E_r$ is decremented, and that the difference $E_r$ between the number of input pulses and the number of feedback pulses is stored in the error register 107b. Numeral 108 denotes a digital-analog DA converter for generating an analog voltage proportional to the content of the error register 107b. Numeral 109 denotes a speed control circuit. It should be noted that 108, and 109 form a motor drive circuit.

The operation of the arrangement embodied in FIG. 1 will now be described. First, prior to machining, NC data is read from the paper tape 101 by the tape reader/puncher 102e, and the NC data from the paper tape 101 is stored in the data memory 102c via the bus 102j. Next, when a start command is applied to the processor 102a via the bus 102j by manipulating the operator's panel 102d, the processor 102a successively reads and executes the machining control program stored in the program memory 102b. Specifically, required parameters (NC parameters, feed speed, machining voltage, etc.) are read out of the data memory 102c together with the NC data, an X-axis move command $X_c$ and Y-axis move command $Y_c$ are created for moving a table (not swhown) in X and Y directions, and these commands are delivered to a table drive unit through an input/output port (not shown), whereby the table is positioned. It should be noted that an arrangement equivalent to the route extending from the input/output port 102g to the servomotor 105 is provided for each of the X and Y axes, though not shown in FIG. 1. The Z-axis move command $Z_c$ is created in similar fashion, and the M-, S- and T-functions are delivered to the machine through the magnetics panel (not shown). The move command $Z_c$ is delivered to the input/output port 102g via the bus 102j. When the move command is applied to the pulse distributor 103 from the input/output port 102g, the pulse distributor 103 produces distributed pulses $P_s$ by performing a pulse distribution operation based on the move command $Z_c$. Upon receiving the pulses $P_s$, the accelerator/decelerator circuit 104 accelerates and decelerates the pulse rate thereof and applies the train of command pulses $P_i$ to the error calculating and storing circuit 107. Thus, the content of the error register 107b becomes non-zero, so that the DA converter 108 provides a voltage and the motor 105 is driven by the speed control circuit 109 to move the electrode EP. When the motor 105 has rotated by a predetermined amount, the feedback pulse FP is generated by the pulse coder 106 and is applied to the error calculating and storing unit 107. The difference $E_r$ between the number of commanded pulses $P_i$ and the number of feedback pulses FP is stored in the error register 107b. Thenceforth, the motor 105 is servo-controlled to make the error $E_r$ approach zero, whereby the electrode EP is fed for machining and moved toward a target position.

A variety of files, of which the following are examples, are registered in the submemory 102f:

I. Feed velocity conforming to workpiece material;

II. Applied current conforming to workpiece material;

III. Override quantity conforming to workpiece material;

IV. Machine status information; and

V. Operating time for each process.

Items I through III are stored beforehand as files in the submemory 102 and are called to a screen for reference when data are entered. Items IV and V are created as the machine is operated and are called to the screen for confirmation when necessary.

The files are stored in the submemory 102f upon being provided with file names, and the files are accessed by entering the file names. Among the files are those that are to be left unchanged. Such files require protection. To this end, according to the present invention, among the files F1, F2, F3 ... that are stored in the submemory 102f, file names f1, f2 of files F1 and F2 which are to be protected are preset as system parameter data in the parameter area PM of the data memory 102c. When an operation is carried out, it is confirmed whether there is a protected file name stored in the parameter area PM prior to executing any of the following operations:

(a) file deletion (b) file substitution (c) file name change

Figure 2:
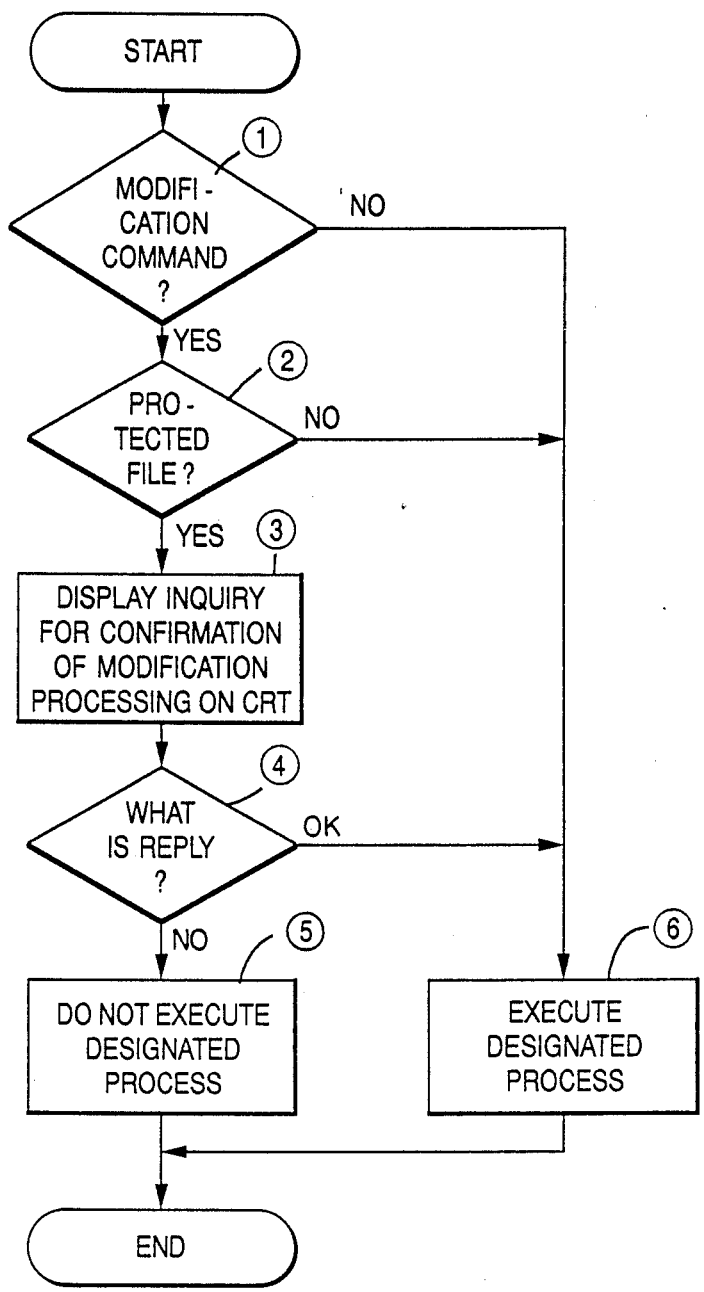
FIG. 2 is a flowchart of processing embodying the present invention.

FIG. 2 is a flowchart of processing embodying the present invention. To access a file in the submemory 102f, an operation command and the name of the object file are entered from the operator's panel 102d. These are transmitted to the processor 102a via the bus 102j. As a result, the processor 102a is placed under the control of a file processing program in the program memory 102b and determines whether the operation command is one of the above-mentioned modification commands (a), (b) or (c) (step 1 ). If the command is not a modification command, the processing designated is executed (step 6 ). If the command is a modification command, then the object file name entered is compared with protected file names f1, f2 stored in the parameter area PM of the data memory 102, whereby it is determined whether the object file (step 2 ) is a protected file. If the object file name is not protected, the designated modification process is executed. If the object file is a protected file, then the processor 102a causes the display device 102i to display an inquiry via the bus 102j (step 3 ). Specifically, the display device 102i will present a display reading "OK TO MODIFY ENTERED FILE!". In response, the operator verifies the entered file name, checks to determine whether there is an error, and enters "NO" from the operator's panel 102d if there is an error, whereby the processor 102a ends processing without executing the designated modification process (step 5 ). If there is no error, on the other hand, then "OK" is entered from the operator's panel 102d, upon which the processor 102a executes (step 6 ) the modification process for the file in the submemory 102f corresponding to the entered file name.

Figure 3:
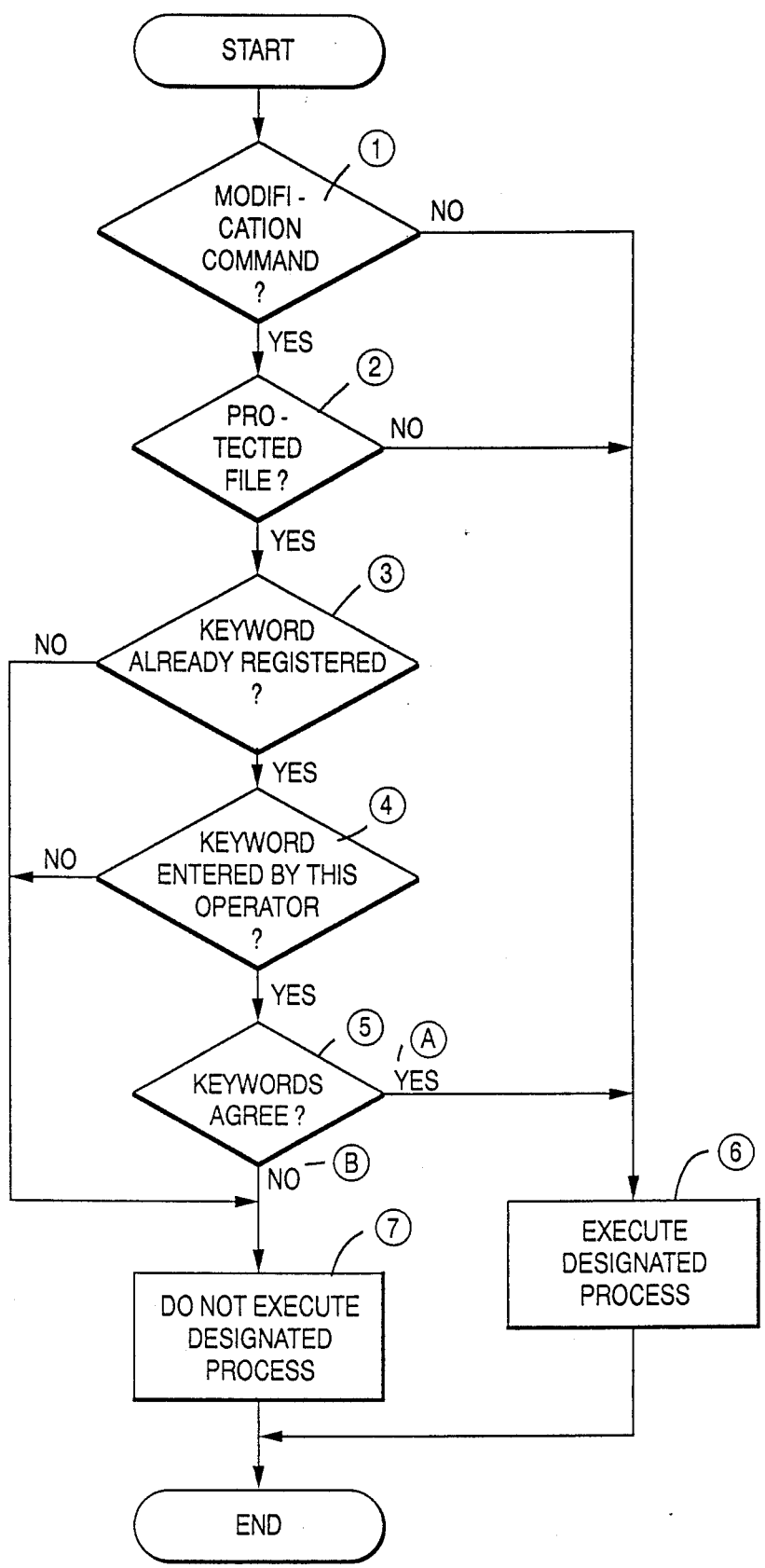
FIG. 3 is a flowchart of processing according to another embodiment of the present invention.

FIG. 3 is a flowchart of processing according to another embodiment of the present invention. This embodiment differs from that of FIG. 2 in that confirmation of the modification process is performed by keyword enter and comparison rather than by an inquiry. That is, entry of a keyword from the operator's panel 102d is set as a condition for modification of a protected file in addition to entry of a modification command and object file name. After steps 1 and 2 identical to those in FIG. 2 are executed, the processor 102a determines whether a keyword is registered in the parameter area PM of the data memory 102c (step 3 ). If no keyword is registered, processing ends without execution of the designated process (step 7 ). If a keyword is registered, on the other hand, the processor 102a determines whether a keyword has been entered from the operator's panel 102d (step 4 ). If no keyword has been entered, processing ends without execution of the designated process. If a keyword has been entered, on the other hand, the processor 102a compares the entered keyword with the keyword stored in the parameter area PM of the data memory 102c (step 5 ). The processor ends processing without executing the designated process if the two keywords fail to agree (step 7 ), and executes the designated modification process when the keywords do agree (step 6 ).

The foregoing relates to a case where the invention is applied to a die-milling electric discharge machine. However, the present invention can also be applied to an NC automatic programming apparatus or the like, in which case the files would be (i) material files specifying cutting conditions conforming to various workpiece materials (iron, aluminum, stainless steel, . . . ), and (ii) files used to enter quadrants drawn on a design drawing.

According to the present invention as described above, in a numerical control unit having a processor, a memory and input means, files and the name of a file to be protected are stored in the memory, a comparison is made with the name of the protected file in the memory in accordance with a modification command and a file name entered from the input means, and file modification processing is permitted when the entered file name is the protected file and, further, on the condition that there is a modification confirmation input from the input means. Accordingly, the invention prevents modification of a protected file in response to erroneous entry of a file name or an erroneous operation command input from the input means. In addition, a protected file can be modified with ease upon entry of a modification confirmation input, and modification of an unprotected file can be performed exactly as in the prior art. In other words, according to the present invention, among files which are to undergo modification processing, a request for a prescribed confirmatory operation is made with respect to protected files only, thus protecting against an erroneous operation by the operator. The present invention therefore has important practical advantages.

It should be noted that while the present invention has been described in accordance with an embodiment thereof, the present invention is not limited to the above-described embodiment but can be modified in various ways in accordance with the gist thereof, and that such modifications will not depart from the scope of the claims.

According to the present invention, a file which is to be protected, among files which undergo modification processing, is prevented from being manipulated incorrectly by an operator. Accordingly, the present invention may be applied to protection of data in a computerized numerical control unit.

We claim:

1. A numerical control unit file protection system, comprising:
    memory means for storing a control program, at least one unprotected file and at least one protected file, each protected an unprotected file having a filename, said memory means comprising:
        a parameter area for storing filenames only of protected files; and
        a submemory for storing the at least one protected file;
    input means for inputting an object filename in a file modification command, and a processing confirmation; and
    processor means for processing the file modification command by comparing the object filename with the filename of the at least one protected file and, when there is coincidence therebetween, for performing modification processing of the at least one protected file only in response to the processing confirmation being entered on said input means after filename coincidence is determined.

2. A numerical control unit file protection system according to claim 1,
    wherein said processor means further produces, after input of the object filename, a request for input of the processing confirmation, and
    wherein said numerical control unit file protection system further comprises display means for displaying the request for input of the processing confirmation after input of the object filename.

3. A numerical control file protection system according to claim 1,
    wherein said parameter area further stores a registered keyword,
    wherein the processing confirmation is an input keyword, and
    wherein said processor means confirms that modification processing should be performed after comparison by said processor means of the registered keyword and the keyword entered on said input means indicates coincidence therebetween.

4. A numerical control file protection system according to claim 1,
    wherein said parameter area further stores a single registered keyword,
    wherein the processing confirmation is an input keyword, and
    wherein said processor means confirms that modification processing should be performed on any of the protected files after comparison by said processor means of the single registered keyword and the keyword entered on said input means indicates coincidence therebetween.

* * * * *

UNITED STATES PATENT AND TRADEMARK OFFICE
CERTIFICATE OF CORRECTION

PATENT NO. : 4,884,211

DATED : November 28, 1989

INVENTOR(S) : Kishi et al.

It is certified that error appears in the above-identified patent and that said Letters Patent is hereby corrected as shown below:

Col. 1, line 16, "filed" should be --field--.

Col. 2, line 25, after "program" (2nd occurrence) insert --memory--.

Col. 3, line 12, delete ",";
line 28, "swhown" should be --shown--.

Col. 4, line 44, "FILE!" should be --FILE?--;
line 59, "enter" should be --entry--.

Col. 5, line 10, "fall" should be --fail--.

Col. 6, line 6, "an" should be --and--.

Signed and Sealed this

Twentieth Day of November, 1990

Attest:

HARRY F. MANBECK, JR.

*Attesting Officer*  *Commissioner of Patents and Trademarks*